United States Patent
Tsai

(10) Patent No.: US 9,004,388 B2
(45) Date of Patent: Apr. 14, 2015

(54) FISHING REEL WITH INTERCHANGEABLE LINE-GUIDING SYSTEM

(71) Applicant: Yao-Chu Tsai, Taichung (TW)

(72) Inventor: Yao-Chu Tsai, Taichung (TW)

(*) Notice: Subject to any disclaimer, the term of this patent is extended or adjusted under 35 U.S.C. 154(b) by 0 days.

(21) Appl. No.: 14/079,971

(22) Filed: Nov. 14, 2013

(65) Prior Publication Data

US 2014/0138469 A1    May 22, 2014

(30) Foreign Application Priority Data

Nov. 16, 2012 (CN) .................... 2012 2 0608779 U

(51) Int. Cl.
*A01K 89/01*    (2006.01)
*A01K 89/015*   (2006.01)

(52) U.S. Cl.
CPC .................... *A01K 89/015* (2013.01)

(58) Field of Classification Search
USPC .......... 242/273–275, 277–279, 257–260, 271
See application file for complete search history.

(56) References Cited

U.S. PATENT DOCUMENTS

| | | | | | |
|---|---|---|---|---|---|
| 1,472,684 | A | * | 10/1923 | Schmid | 242/279 |
| 1,476,769 | A | * | 12/1923 | Schmid | 242/279 |
| 1,941,227 | A | * | 12/1933 | Russell et al. | 242/279 |
| 2,686,016 | A | * | 8/1954 | Kilian | 242/317 |
| 3,913,859 | A | * | 10/1975 | Miyamae | 242/278 |
| 4,807,827 | A | * | 2/1989 | Welch | 242/279 |
| 4,934,628 | A | * | 6/1990 | Yamaguchi | 242/223 |
| 6,053,444 | A | * | 4/2000 | Yamaguchi et al. | 242/280 |
| 7,568,647 | B2 | * | 8/2009 | Klein | 242/279 |
| 2007/0181727 | A1 | * | 8/2007 | Kitajima | 242/241 |
| 2010/0140385 | A1 | * | 6/2010 | Park | 242/278 |

* cited by examiner

*Primary Examiner* — Emmanuel M Marcelo
(74) *Attorney, Agent, or Firm* — Muncy, Geissler, Olds & Lowe, P.C.

(57) ABSTRACT

A fishing reel with interchangeable line-guiding system includes a body, a fishing reel, and an automated winding component. A lateral cover is fixed to the body. The body has therein the fishing reel. The fishing reel has therein a spindle. A toothed axle is disposed on the outer wall of the spindle inside the lateral cover, flanked by two first intermediate gears, and adapted to mesh with a big gear meshing with the two first intermediate gears. The automated winding component has a second intermediate gear fixed to the body. The second intermediate gear meshes with a line-guiding shaft gear. The line-guiding shaft gear is fixed to the end of a line-guiding shaft. The line-guiding shaft is disposed inside a line-protecting axle. A slider movable laterally is disposed on the outward wall of the line-guiding shaft to enable upward and downward casting.

4 Claims, 6 Drawing Sheets

FISHING REEL WITH INTERCHANGEABLE LINE-GUIDING SYSTEM

BACKGROUND OF THE INVENTION

1. Technical Field

The present invention relates to fishing reels, and more particularly, to a fishing reel with interchangeable line-guiding system.

2. Description of Related Art

A fishing reel is indispensable equipment to fishing sport. Conventional fishing reels are always characterized by unidirectional casting and retrieving, thereby resulting in low casting and retrieving speed and efficiency. The other disadvantage of conventional fishing reels is, the fishing reel only has one fixed line-guiding ring and restricting of lower winding, a stationary winding system incapable of left and right interchange. As a result, conventional fishing reels cannot be flexibly installed to match user's habits and needs.

SUMMARY OF THE INVENTION

It is an objective of the present invention to provide a fishing reel with interchangeable line-guiding system which features a simple structure and ease of use.

In order to achieve the above and other objectives, the present invention provides a fishing reel with interchangeable line-guiding system which comprises a body, a reel foot, a fishing reel, and an automated winding component. The reel foot is fixed in place in front of the body or behind the body. A lateral cover is fixed to the right side of the body. The body has therein the fishing reel. The fishing reel has therein the spindle. The lateral cover has thereon an arm component and a clutch lever disposed inside the spindle. A toothed axle is disposed on the outer wall of the spindle inside the lateral cover, flanked by two first intermediate gears, and adapted to mesh with a big gear meshing with the two first intermediate gears. A brake adjustment wheel connected to the big gear through a crank spindle is disposed outside the lateral cover. A crank is fixed to an end of the crank spindle. An automated winding component is fixed to the top or the bottom of the body. The automated winding component comprises a line-guiding casing. The line-guiding casing has therein a second intermediate gear fixed to the body. The second intermediate gear meshes with a line-guiding shaft gear. The line-guiding shaft gear is fixed to an end of the line-guiding shaft. The line-guiding shaft is disposed inside a line-protecting axle. A line-guiding shaft bushing is disposed at each of two ends of the line-guiding shaft. An outward side of each of the line-guiding shaft bushings is fixed to a line-guiding fixing plate from inside. A slider movable laterally is disposed on an outward wall of the line-guiding shaft. The slider has therein a guiding pawl. Two line-guiding rings are disposed at the slider from above and below, respectively.

In the embodiment of the present invention, a first bearing, a retaining ring holder connected to the left of the first bearing, a retaining ring disposed inside the retaining ring holder, and a button are arranged between the spindle and the fishing reel in sequence. Another end of the button is connected to a button casing by means of a screw. A first compression spring and a compression spring sleeve are disposed on the right of the first bearing. A second bearing is disposed on the right of the compression spring sleeve.

In the embodiment of the present invention, the clutch lever is disposed on the lateral cover by a clutch lever sheath and inserted into the spindle. A positioning switch is disposed between the clutch lever and the clutch lever sheath. A second compression spring is disposed at the end of the positioning switch. A pin is inserted into the left portion of the outward wall of the clutch lever. A third compression spring is disposed at the end of the clutch lever.

In the embodiment of the present invention, an external side of the toothed axle is fixed to the body by a toothed axle fixing plate. An O-ring is disposed at the left portion of the outer wall of the toothed axle. A toothed axle engaging positioning plate is disposed on the left side of the O-ring. A toothed axle engaging unit is disposed on the left side of the toothed axle engaging positioning plate. The toothed axle engaging unit has therein a bearing sleeve.

The fishing reel with interchangeable line-guiding system of the present invention is structurally simple and is characterized in that: a crank is connected to a big gear driving a toothed axle to drive the fishing reel and thereby increases the rotation speed of the toothed axle, multiplies retrieval, and increases retrieving speed; an automated winding component comprises a line-guiding shaft and a slider with a guiding pawl; rotation of the line-guiding shaft causes the slider to slide laterally relative to the line-guiding shaft, thereby enabling lateral winding; two line-guiding rings are disposed at the slider from above and below, respectively, to thereby effectuate upward and downward winding and enable the automated line-guiding system to effectuate vertical and lateral winding; a big gear is flanked by two intermediate gears; the automated winding components operate as a whole and thus undergo left and right interchange without causing functionality deterioration; an engageable/disengageable mechanism, coupled with a clutch lever, a spindle, compression springs, and a toothed axle engaging unit, controls the fishing reel by means of engagement/disengagement and in the presence of a positioning switch which plays an auxiliary role therein; and a reel foot is disposed in front of or behind the body of the fishing reel, selectively and adjustably, to match user preferences.

DETAILED DESCRIPTION OF THE EMBODIMENT OF THE INVENTION

Figure 1:
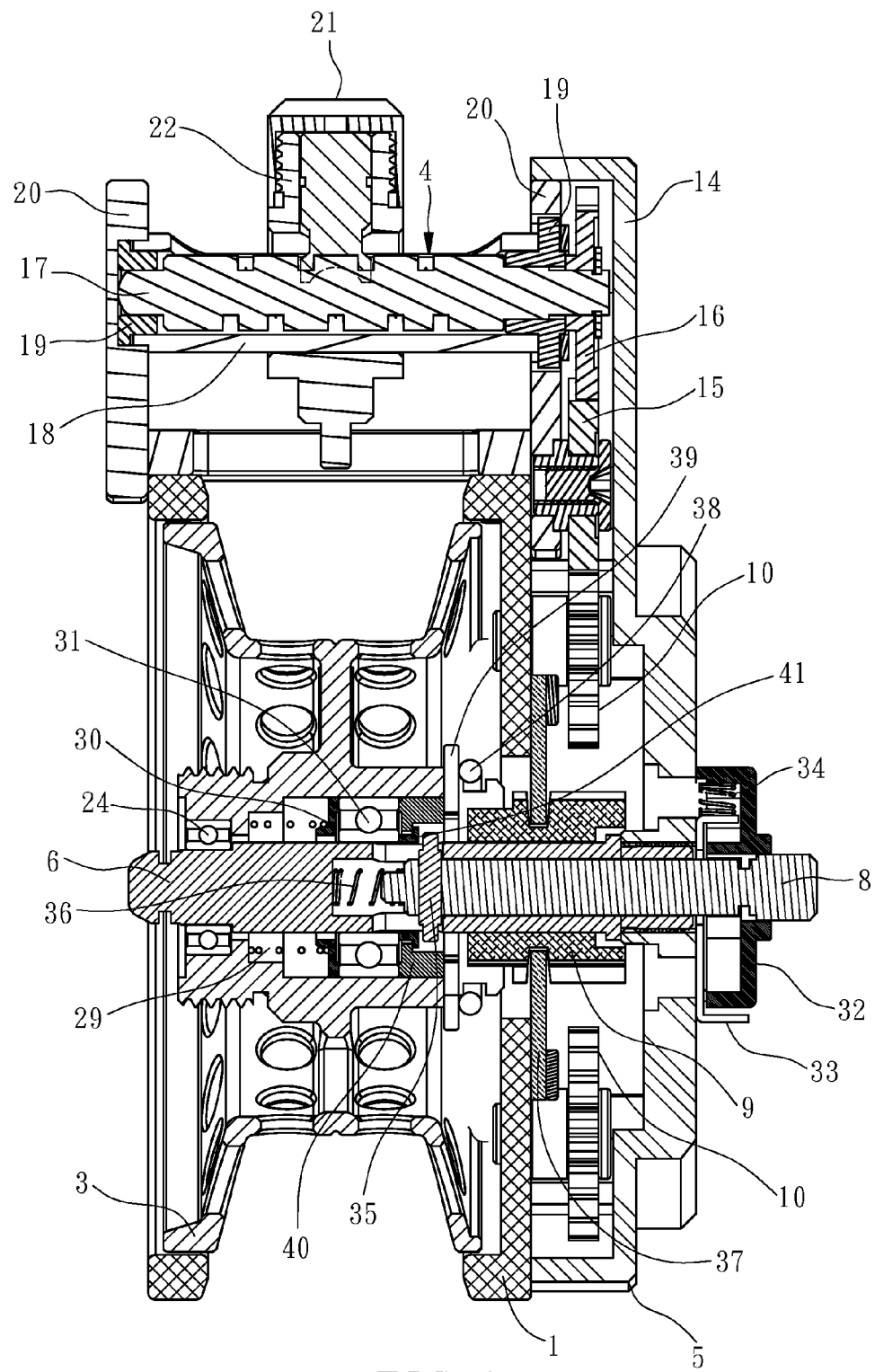
FIG. 1 is a cross-sectional view of a fishing reel with interchangeable line-guiding system according to a preferred embodiment of the present invention.
Figure 2:
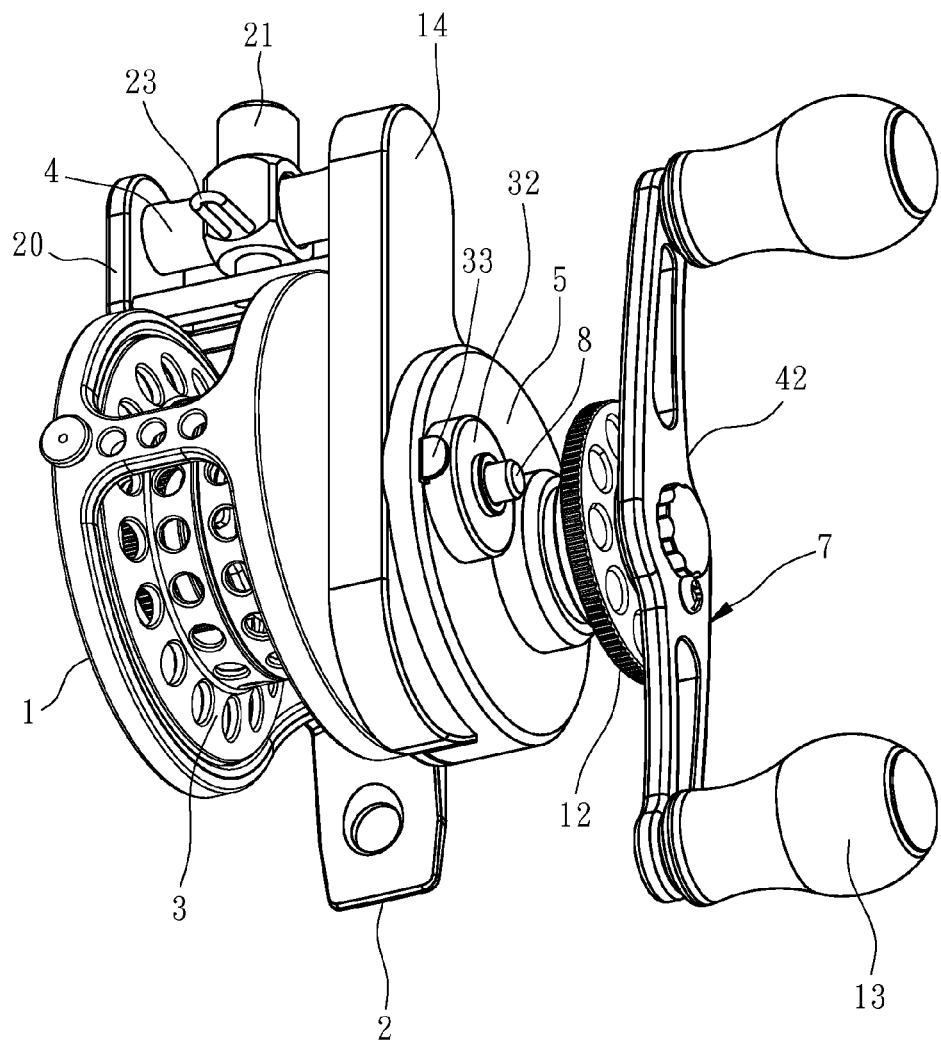
FIG. 2 is a schematic view of the fishing reel according to the preferred embodiment of the present invention.
Figure 3:
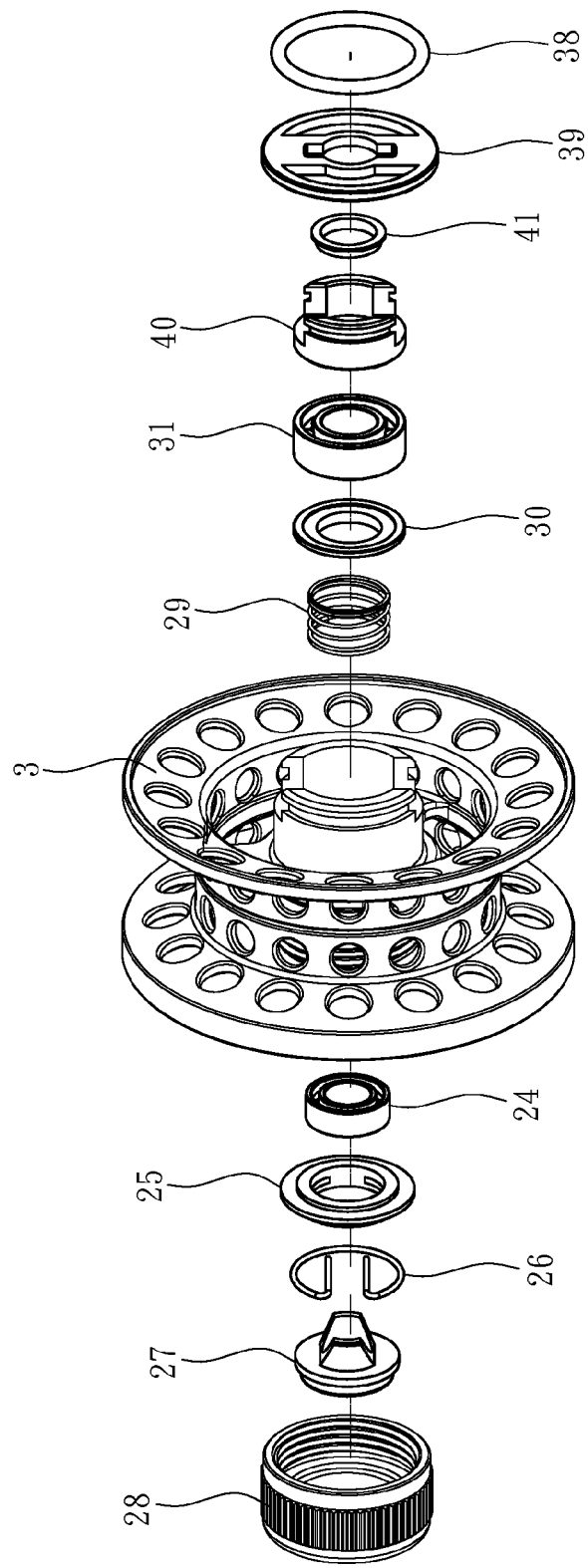
FIG. 3 is an exploded view of inner components of the fishing reel according to the preferred embodiment of the present invention.
Figure 4:
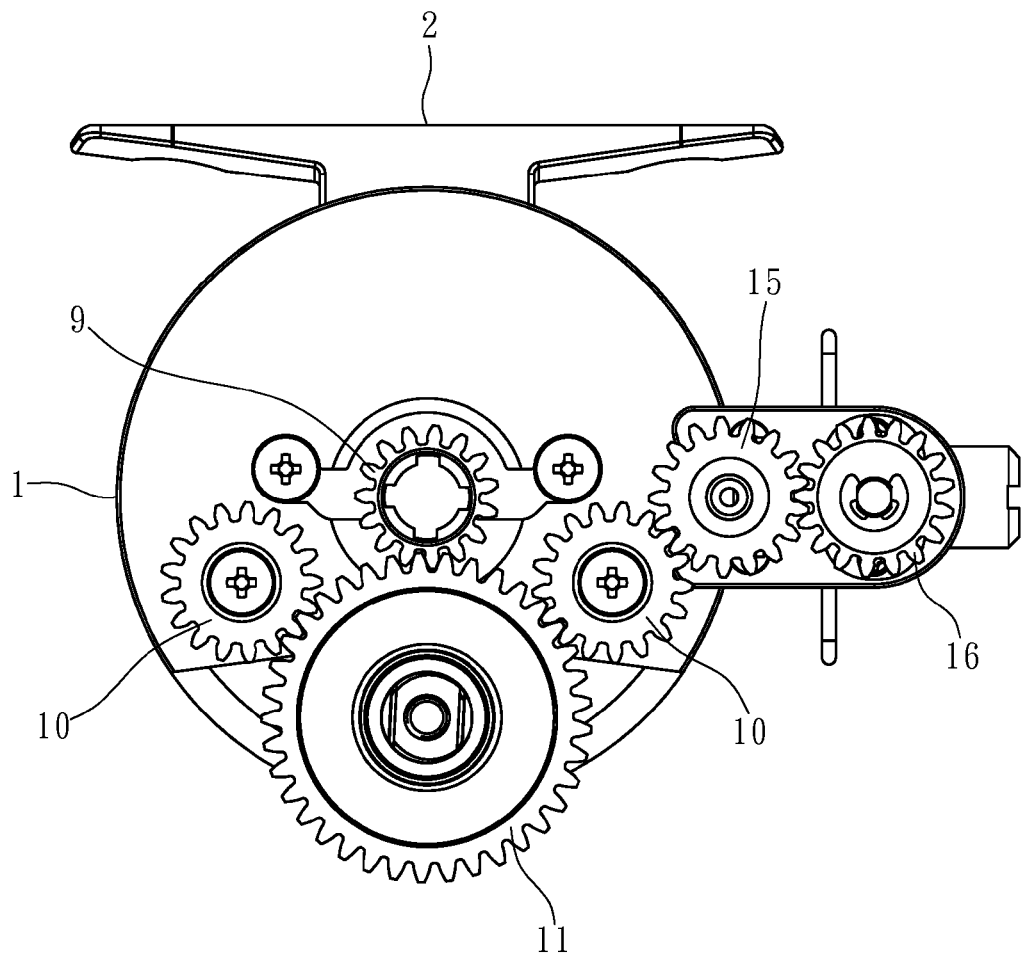
FIG. 4 is a schematic view of a transmission mechanism of the fishing reel according to the preferred embodiment of the present invention.
Figure 5:
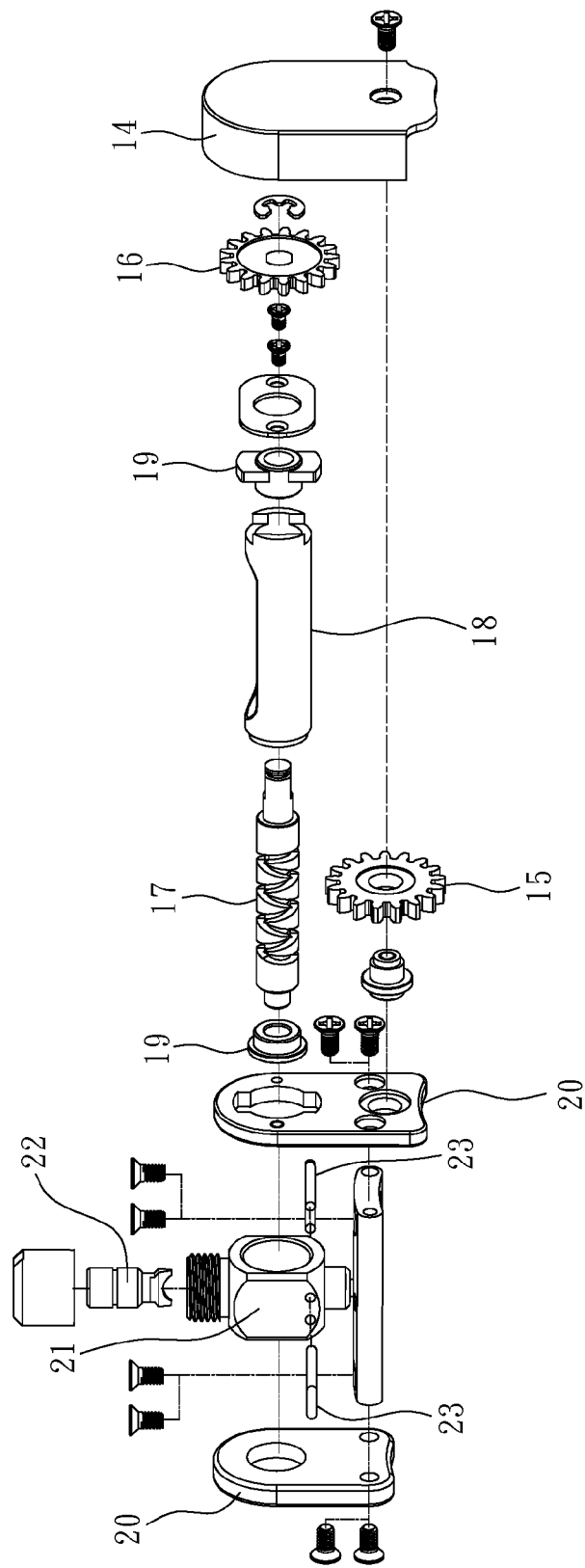
FIG. 5 is an exploded view of a slider of the fishing reel according to the preferred embodiment of the present invention.

Referring to FIG. 1 through FIG. 5, the present invention provides a fishing reel with interchangeable line-guiding system which comprises a body 1, a reel foot 2, a fishing reel 3, and an automated winding component 4.

The reel foot 2 is fixed in place in front of the body 1 or behind the body 1. A lateral cover 5 is fixed to the right side of the body 1. The body 1 has therein the fishing reel 3. The fishing reel 3 has therein a spindle 6. The lateral cover 5 has thereon an arm component 7 and a clutch lever 8 disposed inside the spindle 6. A toothed axle 9 is disposed on the outer wall of the spindle 6 inside the lateral cover 5. The toothed axle 9 is flanked by two first intermediate gears 10. The toothed axle 9 meshes with a big gear 11. The big gear 11 meshes with the two first intermediate gears 10. A brake adjustment wheel 12 connected to the big gear 11 through a crank spindle 42 is disposed outside the lateral cover 5. A crank 13 is fixed to an end of the crank spindle 42. The automated winding component 4 is fixed to the top or the bottom of the body 1. The automated winding component 4 comprises a line-guiding casing 14. The line-guiding casing 14 has therein a second intermediate gear 15 fixed to the body 1. The second intermediate gear 15 meshes with a line-guiding shaft gear 16 and the second intermediate gear 15 let left-handed or right-handed user easily operate the line-guiding shaft gear 16. The line-guiding shaft gear 16 is fixed to an end of a line-guiding shaft 17. The line-guiding shaft 17 is disposed inside a line-protecting axle 18. A line-guiding shaft bushing 19 is disposed at each of the two ends of the line-guiding shaft 17. The outward side of each of the line-guiding shaft bushings 19 is fixed to a line-guiding fixing plate 20 from inside. A slider 21 movable laterally is disposed on the outward wall of the line-guiding shaft 17. The slider 21 has therein a guiding pawl 22. Two line-guiding rings 23 are disposed at the slider 21 from above and below, respectively.

A first bearing 24, a retaining ring holder 25 connected to the left of the first bearing 24, a retaining ring 26 disposed inside the retaining ring holder 25, and a button 27 are arranged between the spindle 6 and the fishing reel 3 in sequence. Another end of the button 27 is connected to a button casing 28 by means of a screw. A first compression spring 29 and a compression spring sleeve 30 are disposed on the right of the first bearing 24. A second bearing 31 is disposed on the right of the compression spring sleeve 30.

The clutch lever 8 is disposed on the lateral cover 5 by means of a clutch lever sheath 32. A positioning switch 33 is disposed between the clutch lever 8 and the clutch lever sheath 32. A second compression spring 34 is disposed at the end of the positioning switch 33. The clutch lever 8 is inserted into the spindle 6. A pin 35 is inserted into the left portion of the outward wall of the clutch lever 8. A third compression spring 36 is disposed at the end of the clutch lever 8.

The external side of the toothed axle 9 is fixed to the body 1 by means of a toothed axle fixing plate 37. An O-ring 38 is disposed at the left portion of the outer wall of the toothed axle 9. A toothed axle engaging positioning plate 39 is disposed on the left side of the O-ring 38. A toothed axle engaging unit 40 is disposed on the left side of the toothed axle engaging positioning plate 39. The toothed axle engaging unit 40 has therein a bearing sleeve 41.

The structure of the fishing reel with interchangeable line-guiding system of the present invention is described above. The operation of the fishing reel with interchangeable line-guiding system of the present invention is described below.

The operation of the fishing reel with interchangeable line-guiding system of the present invention is characterized in that: the toothed axle 9 rotates to generate a torque for driving the rotation of the fishing reel 3; as soon as a user presses the clutch lever 8, the pin 35 disposed at the clutch lever 8 actuates the toothed axle 9 to mesh with the toothed axle engaging unit 40; as soon as the toothed axle 9 rotates, the fishing reel 3 starts to rotate freely and cast; as soon as the user presses the positioning switch 33, the second compression spring 34 bounds freely and actuates the toothed axle 9 to separate from the toothed axle engaging unit 40, such that the fishing reel 3 stops casting; as the second intermediate gear 15 of the automated winding component 4 is operating, the slider 21 can move laterally relative to the line-guiding shaft 17 to thereby enable lateral casting; and the two line-guiding rings 23 are disposed at the slider 21 from above and below, respectively, to thereby effectuate upward and downward casting as needed. The upper portion of the big gear 11 meshes with the toothed axle 9. The big gear 11 meshes with the two first intermediate gears 10 which flank the big gear 11. The first intermediate gears 10 mesh with the second intermediate gear 15. The second intermediate gear 15 drives the line-guiding shaft gear 16.

Figure 6:
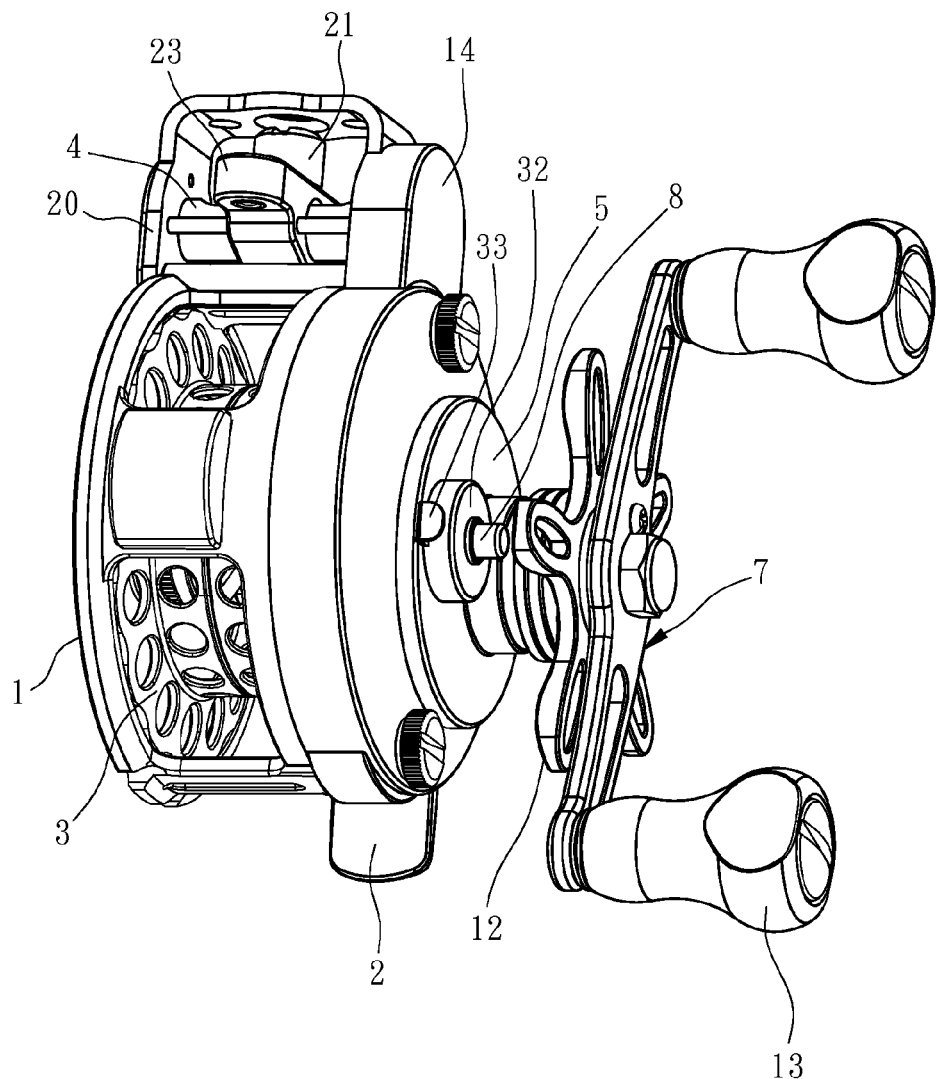
FIG. 6 is a schematic view of the fishing reel according to the other preferred embodiment of the present invention.

Referring to FIG. 6, it is a schematic view of the fishing reel according to the other preferred embodiment of the present invention. It has the same structure with foregoing embodiment, only has different appearance.

The present invention is disclosed above by a preferred embodiment. However, persons skilled in the art should understand that the preferred embodiment is illustrative of the present invention only, but should not be interpreted as restrictive of the scope of the present invention. Hence, improvements and modifications made to the aforesaid embodiment without departing from the technical principles of the present invention should fall within the appended claims of the present invention.

What is claimed is:

1. A fishing reel with interchangeable line-guiding system, comprising:
   a body;
   a reel foot fixed in place in front of the body or behind the body;
   a fishing reel disposed inside the body and having therein a spindle, wherein a lateral cover is fixed to a right side of the body, the lateral cover having thereon an arm component and a clutch lever disposed inside the spindle, wherein a toothed axle is disposed on an outer wall of the spindle inside the lateral cover, flanked by two first intermediate gears, and adapted to mesh with a big gear meshing with the two first intermediate gears, wherein a brake adjustment wheel connected to the big gear through a crank spindle is disposed outside the lateral cover, and a crank is fixed to an end of the crank spindle; and
   an automated winding component fixed to one of a top and a bottom of the body and comprising a line-guiding casing, the line-guiding casing having therein a second intermediate gear fixed to the body, the second intermediate gear meshing with a line-guiding shaft gear fixed to an end of a line-guiding shaft disposed inside a line-protecting axle, wherein a line-guiding shaft bushing is disposed at each of two ends of the line-guiding shaft, and an outward side of each of the line-guiding shaft bushings is fixed to a line-guiding fixing plate from inside, wherein a slider movable laterally is disposed on an outward wall of the line-guiding shaft, the slider having therein a guiding pawl, wherein two line-guiding rings are disposed at the slider from above and below, respectively.

2. The fishing reel with interchangeable line-guiding system of claim 1, wherein a first bearing, a retaining ring holder connected to a left of the first bearing, a retaining ring disposed inside the retaining ring holder, and a button are arranged between the spindle and the fishing reel in sequence, wherein another end of the button is connected to a button casing by a screw, wherein a first compression spring and a compression spring sleeve are disposed on a right of the first bearing, wherein a second bearing is disposed on a right of the compression spring sleeve.

3. The fishing reel with interchangeable line-guiding system of claim 1, wherein the clutch lever is disposed on the lateral cover by a clutch lever sheath and inserted into the spindle, and a positioning switch is disposed between the clutch lever and the clutch lever sheath, wherein a second compression spring is disposed at an end of the positioning switch, wherein a pin is inserted into a left portion of an outward wall of the clutch lever, wherein a third compression spring is disposed at an end of the clutch lever.

4. The fishing reel with interchangeable line-guiding system of claim 1, wherein an external side of the toothed axle is fixed to the body by a toothed axle fixing plate, and an O-ring is disposed at a left portion of an outer wall of the toothed axle, wherein a toothed axle engaging positioning plate is disposed on a left side of the O-ring, wherein a toothed axle engaging unit is disposed on a left side of the toothed axle engaging positioning plate, wherein the toothed axle engaging unit has therein a bearing sleeve.

* * * * *